Nov. 27, 1934.  S. N. BUCHANAN  1,982,464
ELECTRICAL FITTING
Filed Feb. 10, 1932  4 Sheets-Sheet 1

INVENTOR-
STEPHEN N. BUCHANAN
BY
Bohleber & Ledbetter
ATTORNEY

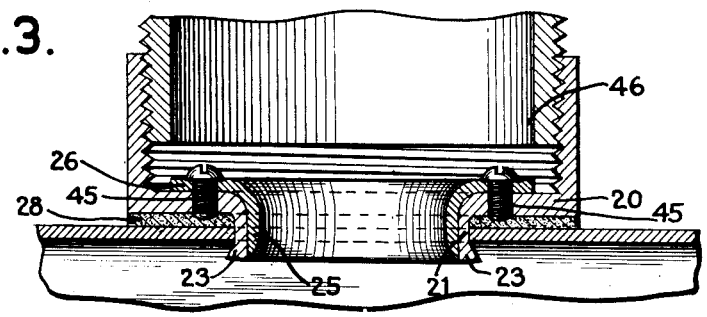
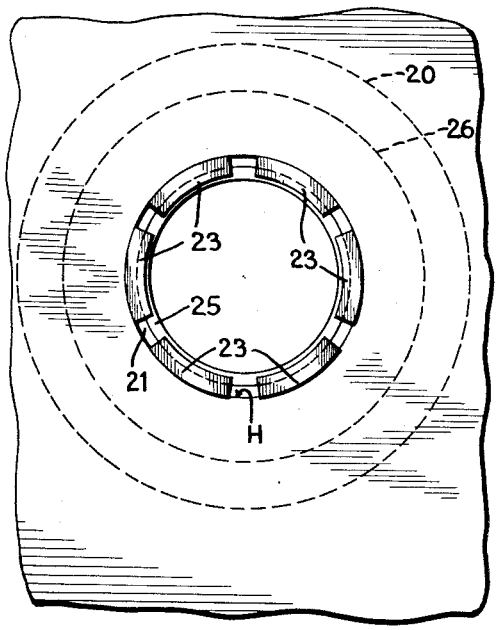
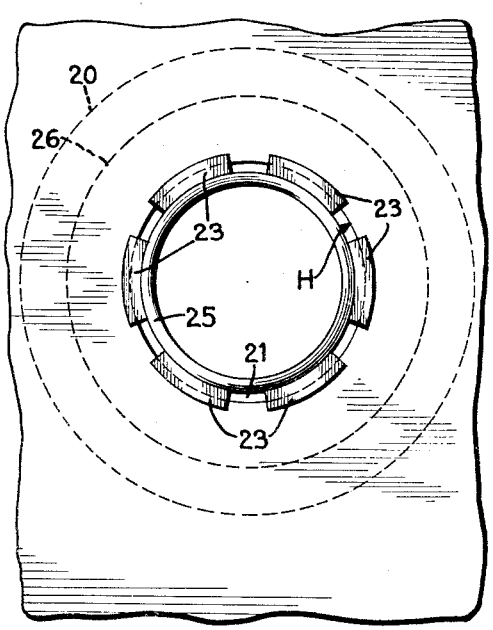
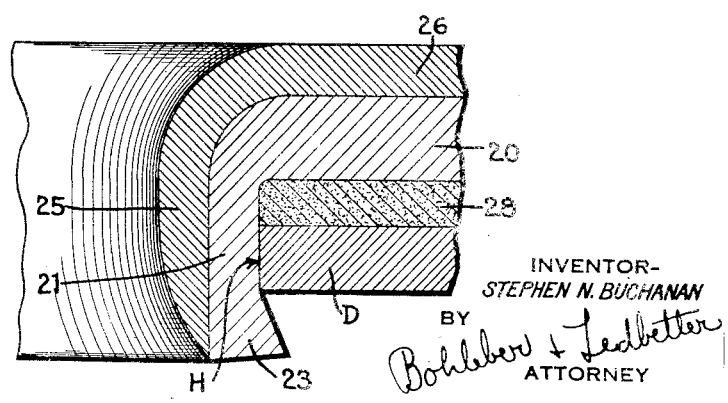

Nov. 27, 1934.  S. N. BUCHANAN  1,982,464
ELECTRICAL FITTING
Filed Feb. 10, 1932  4 Sheets-Sheet 3
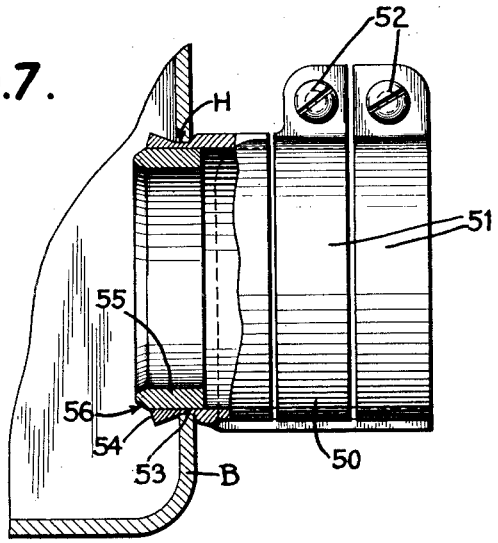
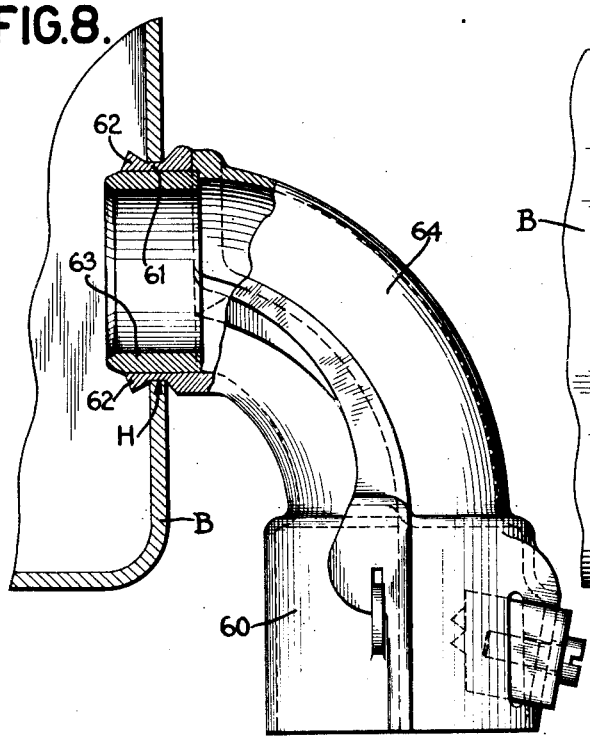
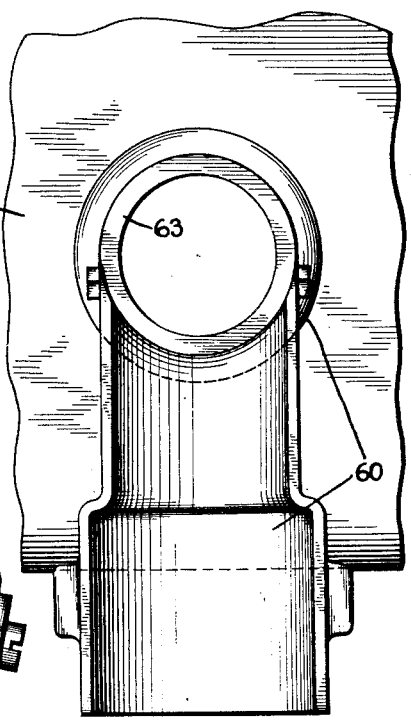
INVENTOR-
STEPHEN N. BUCHANAN
BY
Bohleber & Ledbetter
ATTORNEY Nov. 27, 1934.  S. N. BUCHANAN  1,982,464
ELECTRICAL FITTING
Filed Feb. 10, 1932  4 Sheets-Sheet 4
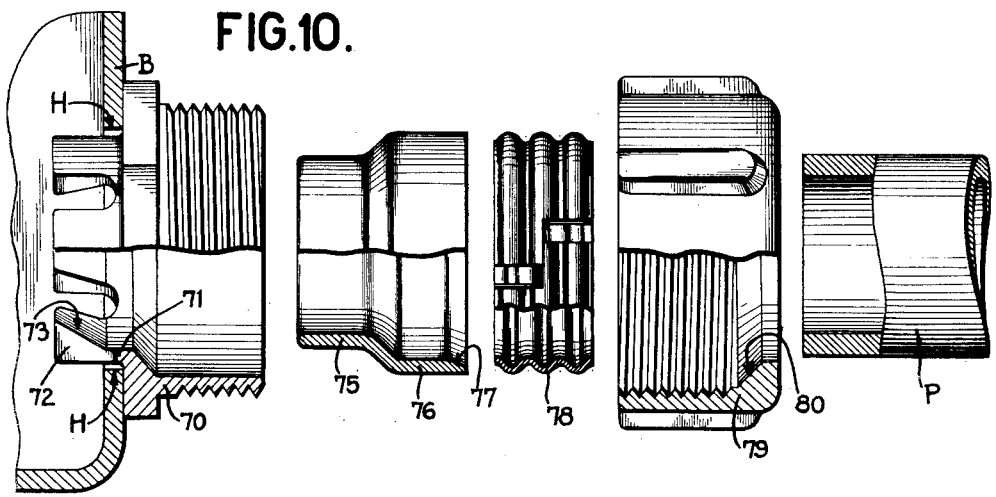
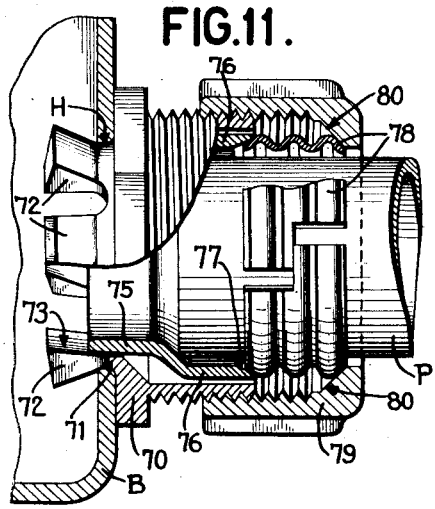
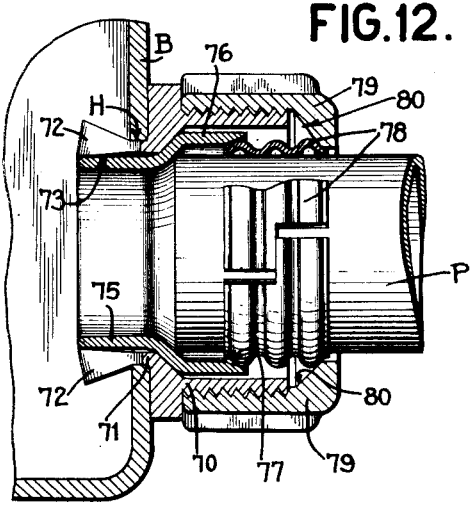
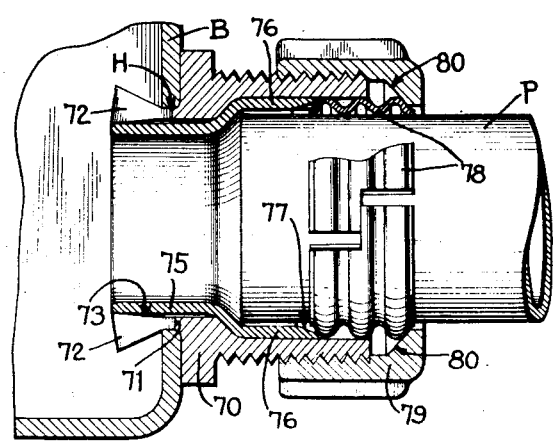
INVENTOR-
STEPHEN N. BUCHANAN
BY
Bohleber & Ledbetter
ATTORNEY Patented Nov. 27, 1934

1,982,464

UNITED STATES PATENT OFFICE 1,982,464

ELECTRICAL FITTING

Stephen N. Buchanan, Elizabeth, N. J., assignor to The Thomas & Betts Co., Elizabeth, N. J., a corporation of New Jersey Application February 10, 1932, Serial No. 591,971

2 Claims. (Cl. 247—28)

The invention relates to electrical fittings which are adapted to be secured within openings in ducts, outlet boxes and similar electrical equipment. The electrical fittings are secured within the openings by a novel means and the fittings may be of varied forms and suited for varied purposes and that form of electrical fitting designed for the floor ducts is adapted to receive one of several different types of electrical devices which serve different purposes in the wiring of a building, as will appear more fully hereinafter.

An object of the invention is to provide an electrical fitting which is insertable in an opening in ducts, conduit boxes, or other electrical structure and is anchored therein by novel wedging means which is manipulated from the outside of the wall containing the opening and when being anchored within the opening in the wall, the anchorage wedging means has a movement from the fitting towards the interior of the duct, box, etc.

Another object of the invention is to construct an electrical fitting which is adapted to be anchored in an opening in a floor duct and has means by which the position of the floor fitting may be indicated after a concrete flooring has been poured.

Another object of the invention is to provide a floor fitting which is adapted to receive a spotting means and is adapted also to receive electrical devices, such as a floor box for a floor plug or other device, or a conduit attachment or any other structure which the electrical wiring system installed within the building may require.

Other objects of the invention will be more apparent from the following description, taken in connection with the accompanying drawings, in which:

Figure 3 is a cross-section through an electrical floor fitting and duct with the floor fitting anchored within an opening in the duct, the fitting carrying a sleeve to which may be secured or which may form part of an electrical device such as a floor box for a floor plug. This view also shows means carried by the fitting for forcing the anchorage wedging means into anchoring position.

Figure 4 is an end view, taken on line 4—4 of Figure 1, showing expansible flexible projections of the anchorage means upon the end of the fitting after their insertion within an opening, such as in the floor duct, and prior to their expansion for anchoring the fitting within the opening.

Figure 5 is an end view, taken on line 5—5 of Figure 2, showing the flexible projections of the anchorage means expanded outwardly and thereby anchoring the electrical fitting within the opening.

Figure 6 is an enlarged partial cross-section of a portion of the anchorage means by which the electrical fitting is anchored within an opening showing the flexible projections of the anchorage means expanded outwardly to anchor the fitting within the opening.

Figure 7 is a cross-section through an electrical fitting and outlet box showing a squeeze type of connector secured within an opening in an outlet box by means of the anchorage means shown in Figures 1 through 6.

Figure 8 is a partial cross-section through an elbow type of fitting having a removable cover and through a portion of the outlet box showing the anchorage means adapted to the elbow type fitting for securing the fitting within an opening such as in an outlet box.

Figure 9 is an end view of the elbow fitting of Figure 8 with the removable cover removed to show the manner in which the elbow type of fitting can be anchored within the opening with the anchorage means shown in Figures 1 to 8 inclusive.

Figure 10 is an exploded view of an electrical fitting of the contractile sleeve type adapted to secure a conduit having an unthreaded end within the fitting.

Figure 11 is a partial cross-section through the assembled fitting of Figure 10 showing the fitting anchored within the outlet opening and the conduit or pipe prior to being anchored within the fitting.

Figure 12 is a cross-section of the electrical fitting of Figure 11 with the fitting anchored within the box hole opening and the conduit anchored within the fitting.

Figure 13 shows an electrical fitting similar to that shown in Figures 10 through 12, but differing therefrom slightly in the length of the fitting which receives the means for gripping and securing the conduit within the fitting.

There are many situations in running electrical wiring systems through buildings where it is particularly economical and convenient to have an anchorage means for electrical fittings which is insertable wholly from one side of the wall carrying the opening in which the electrical fitting is to be anchored and which is operable by movement through the fitting towards the duct, box, etc. This is particularly true in the attachment of electrical fittings to floor ducts and also in the mounting of electrical outlet boxes which are some distance below the level of the future floor in a poured concrete construction and are placed in position within the concrete forms prior to pouring the concrete so that the boxes are embedded therein. The anchorage means has relatively wide application and is adapted to be used for anchoring electrical fittings of various types within outlet openings as will be described hereinafter.

Figure 1:
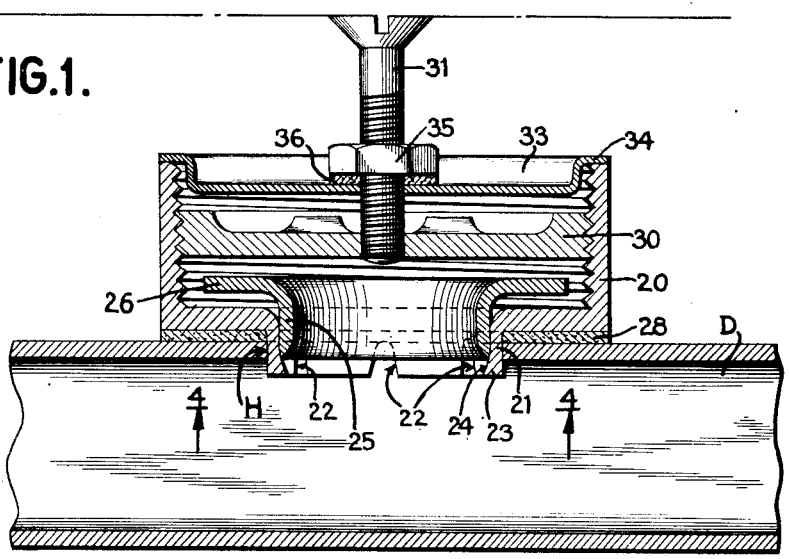
Figure 1 is a cross-sectional view through a floor duct and an electrical fitting preparatory to being anchored within an opening in the duct with the electrical fitting carrying a spotting device to indicate the position of the fitting embedded in the concrete below the floor surface after the concrete has been poured.

An under floor duct D is shown in Figure 1 having an opening H therein. This floor duct is adapted to receive electrical wiring and usually has outlets at spaced distances so that the electrical wires are available at practically any desired point throughout the floor space of a building. An electrical floor fitting 20 is secured within the opening H in the duct D by anchorage means which will now be described.

The anchorage means comprises an anchorage sleeve 21 projecting from the electrical floor fitting 20 which sleeve carries a plurality of slots 22 which render the end of the sleeve flexible and provide flexible portions or expansible projections 23 upon the end thereof. The anchorage sleeve 21 is cylindrical although this is not essential and has a diameter such that the sleeve is readily inserted within the opening H. The inner circumference of the sleeve 21 is reduced in diameter or carries an inwardly directed shoulder 24. This construction may also be described as the flexible projections 23 carrying inwardly directed shoulders 24. The shoulders preferably have a conical inner surface so that the inner diameter of the anchorage sleeve 21 at its end or of the projections 23 within the shoulders is less than the inner diameter of the sleeve spaced from the end. This conical surface upon the shoulder of the projection preferably begins approximately at the point where the anchorage sleeve 21 or projections 23 project beyond the wall of the duct D when inserted therein or approximately at the inner edge of the opening H. The face of the fitting 20 which engages the washer 28 serves as a stop so that the projections 23 will be inserted the desired extent into the opening H.

Figure 2:
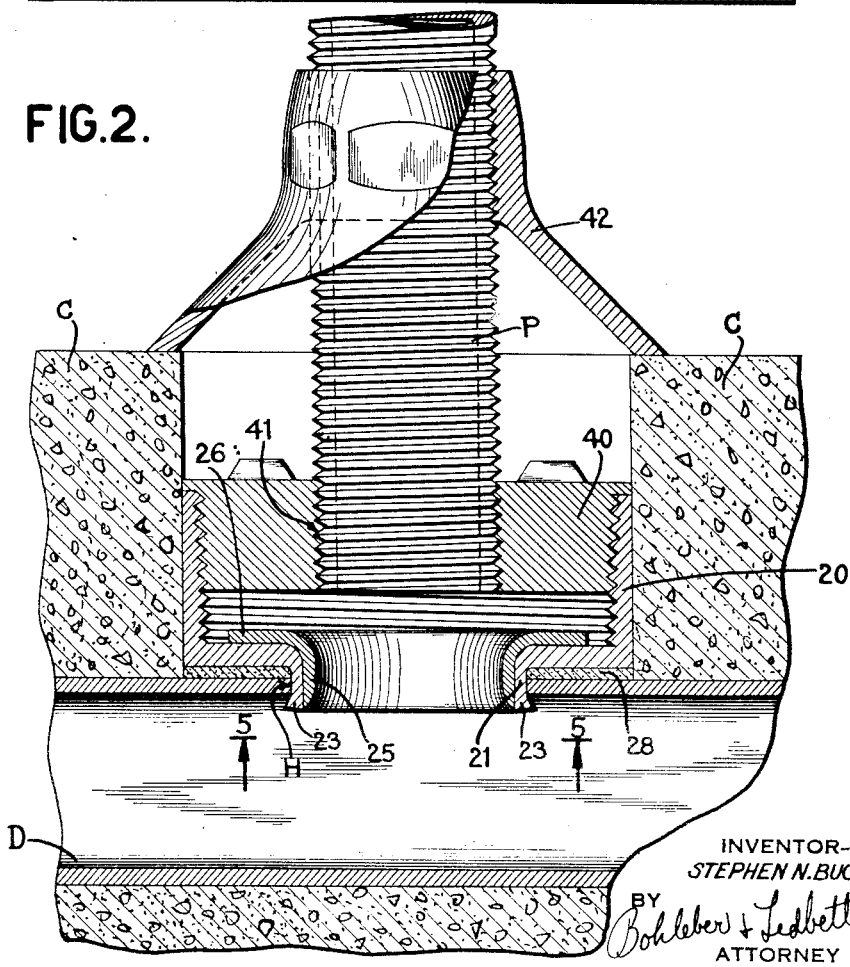
Figure 2 is a cross-section through the duct, fitting and concrete flooring showing the electrical fitting anchored within the opening in the floor duct and with a conduit attachment and guard carried by the fitting and a conduit secured in position therein.

An operating or wedging sleeve 25 has an outer diameter such that it will pass readily into the inner circumference of the anchorage sleeve 21 and engage the shoulders 24. If now the operating member 25 is hammered or otherwise driven or forced within the sleeve 21, it will forcibly engage the shoulders 24 and force outwardly the expansible projections 23, as shown in Figure 2. The end of the anchorage sleeve 21 therefore which projects beyond the wall of the duct D is increased in its diameter, or the expansible projections 23 are forced outwardly and hence the anchorage sleeve and fitting are securely anchored within the duct opening H. The wedging sleeve 25 may carry a flange 26 which abuts against the end of the electrical floor fitting 20 when the operating sleeve 25 has been driven into the anchorage sleeve 21 so that the end thereof or the flexible projections 23 are expanded. This limits the extent of inward movement of the wedging sleeve 25. The wedging sleeve provides a passage therethrough for electric wires from the duct into the fitting 20.

The electrical floor fitting 20 may have a washer 28 positioned between the floor fitting 20 and the duct D to form a moisture tight seal therebetween. This washer may be of any material desired and there are any number of materials adapted for the purpose.

The electrical floor fitting 20 is adapted to receive devices of various sorts and hence is preferably internally threaded so that it may threadedly receive those devices. In Figure 1 the electrical floor fitting 20 carries a spotter carrying member 30 which member carries a spotter 31. This spotter preferably is nothing more than a screw threaded into the carrying member 30 and may be adjusted within the carrying member 30 so that the upper position of the top of the screw 31 or the top of the head of the screw if it carries one, is exactly level with the floor level to which concrete is to be poured. The spotter 31 will therefore assist in determining the depth of concrete when the concrete is poured, but its principal purpose is to be visible in the surface of the concrete floor so that the position of the opening H into the duct D and the position of the electrical floor fitting 20 may be quickly located.

A shield or protector 33 is adapted to be positioned upon the end of the electrical floor fitting 20 so that the threads for the electrical fitting will be protected and will not fill up with concrete when it is poured. The shield 33 is preferably dish-shaped so that a flange 34 engages the end of the electrical fitting 20 and the dished portion of the shield aligns itself with the inner diameter of the sleeve and thereby assists in holding the shield in position. A nut 35 is carried by the screw 31 and threaded down upon the shield 33 to securely hold the shield upon the end of the electrical fitting 20. A soft washer 36 is preferably positioned between the nut and the shield 33 to prevent moisture and wet concrete from seeping down through the shield. The shield 33 and the spotter carrying member 30 form a spotter carrying and fitting closing means.

After the concrete floor C has been poured and hardened, as shown in Figure 2, the outlets desired have been indicated by the spotter 31 and the workman cuts out the concrete to expose the electrical floor fitting 20. Various electrical devices may be secured to the electrical fitting 20, depending upon the type of electrical device or connection desired at this point.

A conduit receiving member 40 has been threaded into the electrical fitting 20 in Figure 2. The conduit receiving member is threaded at 41 to receive the threaded end of the conduit or pipe P. In order to provide additional support for the conduit P and in order to conceal the opening cut in the concrete floor, the end of the pipe P is threaded at some length from its end so that it will receive a threaded cover 42. The cover 42 provides an additional support for the pipe P and has an outer circumference large enough so that it engages the concrete floor C and completely covers the hole in the floor extending to the electrical floor fitting 20. By threading the cover 42 down upon the pipe P, the cover engages the floor and thereby clamps the pipe P within the fitting. The cover 42 also provides a rigid support for the pipe.

The wedging sleeve 25, shown in Figure 1, is forced into the sleeve 21 to engage the projections 23 and expand them by hammering the operating member into the sleeve. In Figure 3, the flange 26 of the wedging sleeve is provided with holes through which operating means or screws 45 project and are threaded into the electrical floor fitting 20. Tightening of the screws 45 will force the wedging sleeve 25 down through the sleeve 21 so that the flexible projections 23 are forced outwardly to anchor the electrical floor fitting within the hole H of the duct D. Any other means for forcing the wedging sleeve into the sleeve 21 is contemplated.

The electrical floor fitting 20 of Figure 3 also shows a member 46 threaded thereinto which member is adapted to carry any desired electrical device, such as the floor box shown in my copending application Serial No. 326,512. This electrical floor box is adapted to receive a floor plug or socket which is fully described in the copending application and hence will not be further described herein.

The anchorage means described in Figures 1 through 6 may be used for securing many forms of electrical fittings within an opening, such as in the outlet box B shown in Figure 7. The electrical fitting shown in this figure is a squeeze type fitting 50. This type of fitting has one or more flexible straps 51 which are contracted by means of operating screws 52 as is well known, and is particularly adapted for clamping cable therein, although the fitting is suitable as well for conduit. This fitting carries a sleeve 53 having a flexible end or expansible projections 54 which sleeve end or projections have been expanded upon the inner side of the box wall so that the sleeve and fitting are firmly anchored within the opening H. The wedging sleeve 55 has a diameter such that it will slide easily into the sleeve 53 and engage the inwardly directed shoulders, like the shoulders 24 in Figure 1, so that the sleeve end or projections will be expanded outwardly. The wedging sleeve 55 is also shown as carrying a tapering surface 56. This surface engages the inwardly directed shoulders upon the inner circumference of the projections 54 to more easily force the projections outwardly so that the anchorage sleeve 21 will be anchored within the opening.

The anchorage means may also be used upon an elbow fitting 60 to secure this type of electrical fitting within an opening H, such as in a box B. The end of the elbow fitting 60 carries an anchorage sleeve 61, as in the other constructions, which sleeve is flexible at its end or has expansible projections 62 in that portion of the sleeve which projects beyond the box wall when the sleeve has been inserted within a box hole opening H. The wedging sleeve 63, similar to the wedging sleeve 55 of Figure 7, is forced into the anchorage sleeve 61 and engages the inwardly extending shoulders upon the projections 62 to force them outwardly and thereby anchor the fitting within the box hole H. The wedging sleeve, as in the other constructions described hereinbefore, provides a wire passage therethrough into the box B.

In order that the wedging sleeve 63 may be forced into the anchorage sleeve 61, the elbow must be of such a form so that the wedging sleeve 63 may be inserted and forced into the anchorage sleeve 61. The split type elbow is well adapted to expose the outer end of the anchorage sleeve 61 so that the wedging sleeve 63 may be inserted and forced therein, as shown in the end view, Figure 9. The removable cover 64 for closing the split elbow may project over the end of the wedging sleeve so that it will be prevented from being removed therefrom or being forced or otherwise moved backwardly out of the elbow.

The anchorage means may be provided upon an electrical fitting having a contractile sleeve as a part of its structure for gripping electrical conduit. This type of electrical fitting is shown in Figures 10 through 13 and consists of a threaded member 70 having an anchorage sleeve 71 projecting therefrom which sleeve has a flexible end or carries expansible projections 72. The projections 72 have shoulders directed inwardly and the shoulders preferably have a conical surface 73 thereupon so that the smaller diameter thereof is at the outer end of the projections. A wedging member 75 having a diameter so that it will pass easily through the anchorage sleeve 71 is inserted into the anchorage sleeve and forced against the conical surfaces 73 to expand the projections 72 and thereby anchor the threaded member 70 within the box hole opening H of the box B. The expansible projections 72 or the conical surfaces 73 thereof begin at a point upon the sleeve 71 where it projects through the wall of the box B as discussed with respect to the other constructions. The wedging sleeve 75 preferably has an enlarged diameter 76 which diameter is adapted to receive the unthreaded end of a conduit P. The larger end of the wedging sleeve 76 which receives the conduit or pipe P carries an internal taper 77. The end of a contractile sleeve 78 engages with the taper surface 77 and its other end is engaged by an internal taper 80 upon a threaded nut 79 which is threaded upon the threaded member 70. Upon threading the nut 79 upon the threaded member 70, the internal taper 80 moves towards the internal taper 77 and contracts the sleeve 78 to grip the unthreaded end of the conduit P. The contractile sleeve 78 may be of any form and the corrugated contractile sleeve shown is described in the copending application of Lewis H. Church, Serial No. 546,176.

The parts of the electrical fitting are assembled together, as shown in Figure 11, where the wedging sleeve 75 has not been forced into the anchorage sleeve 71 sufficiently far to expand the projections 72. One end of the contractile sleeve 78 is shown as engaging the internal taper 77 upon the wedging sleeve 76 and the other end of the contractile sleeve being engaged by the internal taper 80 upon the threaded nut 79. In assembling this fitting, the wedging sleeve 75 is driven into the anchorage sleeve 71 to expand the projections 72 in the same manner that the wedging sleeves expand the projections or the flexible end of the anchorage sleeve in the other forms shown in Figures 1 through 9, after which the contractile sleeve 78 and the nut 79 may be mounted upon the threaded member 70 and the conduit P inserted therein. Tightening of the nut 79 thereupon contracts the contractile sleeve 78 to grip the conduit P therein. The nut 79 and contractile sleeve 78 in engaging the end of the wedging sleeve 75 prevents the removal of the wedging sleeve and hence the electrical fitting is securely anchored within the box hole opening H so long as the nut is threaded upon the threaded member.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:

1. An electrical device comprising an electrical fitting having a relatively large diameter, an anchorage sleeve projecting therefrom, expansible projections carried by the anchorage sleeve, shoulders directed inwardly at a substantial angle upon the inner surfaces of the projections, a wedging sleeve forming a wire passage therethrough projected through the electrical fitting and anchorage sleeve and forcibly engaging the shoulders to press the projections outwardly to form outwardly extending shoulders having a substantial angle with respect to the anchorage sleeve, and a conduit supporting member secured to the electrical fitting and having an opening of smaller diameter therein to receive a conduit.

2. An electrical device comprising an electrical fitting, an anchorage sleeve projecting therefrom, expansible projections carried by the anchorage sleeve, shoulders directed inwardly at a substantial angle upon the inner surfaces of the projections, a wedging sleeve forming a wire passage therethrough projected through the electrical fitting and forcibly pressed against the shoulders within the anchorage sleeve to press the projections outwardly to form outwardly extending shoulders having a substantial angle with respect to the anchorage sleeve, a conduit supporting member secured to the electrical fitting and having an opening therein, a conduit secured in the opening, and a supporting cover secured to the conduit and adapted to engage a floor to cover the hole in the floor for the fitting and to support the conduit.

STEPHEN N. BUCHANAN.